Patented Aug. 4, 1931

1,817,522

UNITED STATES PATENT OFFICE

WILLIAM PERCY PRICE, OF LONDON, ENGLAND, ASSIGNOR, BY MESNE ASSIGNMENTS, TO HORACE CORY AND COMPANY, LIMITED, OF LONDON, ENGLAND, A COMPANY OF GREAT BRITAIN

MANUFACTURE OF PRINTING INKS

No Drawing. Application filed February 6, 1925, Serial No. 7,244, and in Great Britain March 13, 1924.

This invention relates to the manufacture of printing inks, and is concerned with the preparation and use of an addition to such inks to enable them to be used for printing without any necessity for the use of damping apparatus in connection with the printing surfaces in processes which depend upon the grease-repelling property of water for selectively inking those surfaces, such as lithography and the bromoil and other photographic processes. As, however, the invention is particularly advantageous in its application to lithographic printing, it is hereinafter described only in that connection, but this is to be regarded merely as a convenient example.

With this same object in view, it has been heretofore proposed to add to lithographic inks, mixtures comprising a grease-resisting substance such as glycerine and salts which have the property of liquefying by absorption of moisture from the atmosphere. Such mixtures, however, have not heretofore proved to be productive of practically effective results under continuous printing conditions, without the use of damping apparatus, and it is the aim of this invention to eliminate the disadvantages arising from their use.

The invention contemplates a method of manufacture which includes the incorporation with the ink of an aqueous solution of a suitable salt, or mixture of salts, either emulsified in oil, in which case the emulsion is incorporated with the ink, or emulsified in the ink itself, with the aid of an added emulsifying agent or agents, in cases where the nature of the materials employed renders such addition necessary or desirable.

In carrying out the invention a number of different salts are available the solutions of which have properties essential in all applications of the invention, and the salts may be indicated generally by reference to such properties. Thus, the solutions must be capable of forming, either with or without the aid of an added emulsifying agent, a water-in-oil type of emulsion, that is to say an emulsion in which the oil or ink is the continuous phase enclosing droplets of the aqueous solution as the disperse phase. The salt should be deliquescent so that the solution will not crystallize or dry up while in use, and will be capable of producing a wetting effect on the lithographic stone or plate, which is continuous during the printing operation. The selection, for any particular case, of a suitable salt forming an aqueous solution having these general properties, is however, limited by various considerations, for example, the necessity for avoiding deleterious effects on the pigments incorporated in the ink.

According to the preferred method of carrying out the invention, the emulsion is first formed with the solution and lithographic varnish and subsequently incorporated with the ink, after the process of grinding the latter has been completed.

The constitution of the emulsion, and the proportion thereof which is incorporated with a given quantity of ink, are dependent, to some extent, upon the nature of the ink and the work on which it is to be employed. The invention will, therefore, be best understood, by stating the constitution and proportions applicable to the main applications of the invention. For example, an emulsion affording highly satisfactory results when used in connection with direct lithographic printing, is produced from the following ingredients:—

21 parts by weight of a solution of calcium chloride containing 39% by weight of chloride; 8 parts by weight of linseed oil varnish of the kind known in the trade as "Mid Varnish"; 2 parts by weight of petroleum jelly, and one part by weight of ammonium chloride or borax.

When, however, the emulsion is to be incorporated with inks for use in lithographic offset printing, it has been found that an emulsion constituted as follows is eminently satisfactory:—

14 parts by weight of a solution of calcium chloride containing 39% by weight of chloride; 4 parts by weight of the "Mid Varnish" above referred to; 4 parts by weight of thin linseed oil varnish; 8 parts by weight of petroleum jelly, and one part by weight of ammonium chloride or borax.

In the preparation of each of the above emulsions, it is preferable to dissolve the ammonium chloride or borax, as the case may be, in the calcium chloride solution, the several ingredients being then thoroughly emulsified by any convenient apparatus.

The ammonium chloride or borax constituent of an ink embodying an emulsion prepared as above stated has a two-fold function, with reference to the plate or stone and to the ink. It serves primarily, by its action on the plate or stone, to prevent the calcium chloride from attacking the same and forming thereon a surface which will not repel the ink, thus tending to prevent "scumming", i. e. the deposition of traces of ink on parts of the plate or stone where no ink is required. It also serves to maintain the desired fluidity of the ink, which would have a tendency, in a prolonged printing run and in the absence of such constituent, to run too freely, with resulting uneven distribution of the ink.

The proportion of emulsion to ink is governed mainly by the bulk of the ink itself, and may be determined on the following basis:—For printing inks that bulk largely, such as blacks, madders and bronze-blues, eight parts by weight of emulsion to three parts by weight of ink; for inks of small bulk, such as vermilion, reds on heavy bases, chromes and flake whites, eight parts by weight of emulsion to eleven parts by weight of ink. These proportions are applicable to either of the emulsions particularized above, and will be understood to be variable within the limits given for inks of medium bulk.

According to an alternative method of carrying out the invention, the incorporation of the solution with the other ingredients of the ink may be effected by direct emulsification therewith, any additional oil content that may be required being introduced into the mixture during this operation.

With the solutions and proportions set out above, the emulsifying action of the calcium chloride has been found sufficient to ensure entirely satisfactory results. As, however, the invention is not restricted to the use of this particular salt, to provide for cases where the salt or salts employed have a less powerful emulsifying action, or one tending to the production of an oil-in-water type of emulsion, the invention includes the addition to the solution of one or more additional emulsifying agents such as a water-soluble albuminoid or proteid, or the addition to the lithographic varnish or ink of an oil-soluble emulsifying agent such as magnesium oleate.

It is to be understood that it is within the scope of the invention to make such addition to any particular solution or emulsion as may be necessary to impart or counteract acidity or alkalinity, according to requirements; and further to adopt a method of emulsification in which a plurality of aqueous solutions are emulsified successively in the oil or ink.

It is to be particularly noted that glycerine is not a constituent of the emulsion produced according to any of the methods of carrying out the invention hereinbefore described. As stated above, it has heretofore been proposed to employ glycerine or like grease-resisting substance in a mixture to be added to lithographic inks, the wetting effect of the glycerine on the plate or stone being relied on, either alone or in conjunction with some other ingredient, to perform the same function as water in the ordinary lithographic printing process. Glycerine, however, has not proved satisfactory for this purpose, and I wish it to be understood that in carrying out the present invention its use is entirely dispensed with.

Having described my invention, I declare that what I claim and desire to secure by Letters Patent is:—

1. A method of manufacturing printing ink, characterized by the incorporation in such ink of an emulsion of the water-in-oil type formed with an aqueous solution of at least one deliquescent salt.

2. A method of manufacturing printing ink, characterized by first forming an emulsion of the water-in-oil type with an aqueous solution of at least one deliquescent salt and a linseed oil varnish, and subsequently mixing such emulsion with the other constituents of the ink.

3. A method of manufacturing printing ink, characterized by first forming an emulsion of the water-in-oil type with an aqueous solution of at least one deliquescent salt, a linseed oil varnish and an emulsifying agent, and subsequently mixing such emulsion with the other constituents of the ink.

4. A method of manufacturing printing ink, characterized by the incorporation in such ink of an emulsion of the water-in-oil type formed with an aqueous solution of calcium chloride.

5. A method of manufacturing printing ink, characterized by first forming an emulsion of the water-in-oil type with an aqueous solution of calcium chloride and a linseed oil varnish, and subsequently mixing such emulsion with the other constituents of the ink.

6. A method of manufacturing printing ink, characterized by the incorporation in such ink of an emulsion of the water-in-oil type formed with an aqueous solution of calcium chloride and borax.

7. A method of manufacturing printing ink, characterized by first forming an emulsion of the water-in-oil type with an aqueous solution of calcium chloride and borax and a linseed oil varnish, and subsequently mixing such emulsion with the other constituents of the ink.

8. As a new article of manufacture, a printing ink having as an ingredient an emulsified aqueous solution of at least one deliquescent salt.

9. For use in the manufacture of printing ink an emulsion of the water-in-oil type formed with an aqueous solution of at least one deliquescent salt and a linseed oil varnish.

In testimony whereof I have affixed my signature hereto.

WILLIAM PERCY PRICE.